US009897865B2

(12) United States Patent
Jiang et al.

(10) Patent No.: US 9,897,865 B2
(45) Date of Patent: Feb. 20, 2018

(54) ARRAY SUBSTRATE, METHOD OF MANUFACTURING THE SAME, AND LIQUID CRYSTAL DISPLAY PANEL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Peng Jiang, Beijing (CN); Haipeng Yang, Beijing (CN); Ke Dai, Beijing (CN); Yong Jun Yoon, Beijing (CN); Zhangtao Wang, Beijing (CN); Bingbing Yan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 37 days.

(21) Appl. No.: 15/218,951

(22) Filed: Jul. 25, 2016

(65) Prior Publication Data
US 2017/0199410 A1   Jul. 13, 2017

(30) Foreign Application Priority Data

Jan. 11, 2016   (CN) .......................... 2016 1 0016252

(51) Int. Cl.
*G02F 1/1362*   (2006.01)
*G02F 1/1339*   (2006.01)
(Continued)

(52) U.S. Cl.
CPC ........ *G02F 1/13394* (2013.01); *G02F 1/1368* (2013.01); *G02F 1/133345* (2013.01); *G02F 1/134309* (2013.01); *G02F 1/134336* (2013.01); *G02F 1/136286* (2013.01); *G02F 2001/13629* (2013.01); *G02F 2201/121* (2013.01); *G02F 2201/122* (2013.01); *G02F 2201/123* (2013.01); *G02F 2201/50* (2013.01)

(58) Field of Classification Search
CPC .................................................. G02F 1/13394
See application file for complete search history.

(56) References Cited

U.S. PATENT DOCUMENTS

| | | | | |
|---|---|---|---|---|
| 2010/0053529 | A1* | 3/2010 | Kanaya | G02F 1/13394 349/139 |
| 2010/0225608 | A1* | 9/2010 | Zhou | G02F 1/13338 345/173 |

(Continued)

*Primary Examiner* — Sang V Nguyen
(74) *Attorney, Agent, or Firm* — Kinney & Lange, P.A.

(57) ABSTRACT

An array substrate, a method of manufacturing the same and a liquid crystal display panel are disclosed. In the array substrate, a connection part for connecting two adjacent pixel electrodes is configured to enclose the spacer from three sides and a corresponding thin film transistor is arranged to enclose the spacer from a side other than the three sides. A distance between an upper surface of the connection part and an upper surface of the base substrate is larger than a distance between a lower surface of the spacer and the upper surface of the base substrate. With this configuration, the spacer is limited within a position limiting structure formed by the connection part and the thin film transistor.

18 Claims, 10 Drawing Sheets

(51) Int. Cl.
    *G02F 1/1368*     (2006.01)
    *G02F 1/1343*     (2006.01)
    *G02F 1/1333*     (2006.01)

(56) References Cited

U.S. PATENT DOCUMENTS

| | | | |
|---|---|---|---|
| 2012/0113343 A1* | 5/2012 | Konno | G02F 1/134363 349/39 |
| 2015/0098048 A1* | 4/2015 | Tomioka | G02F 1/133512 349/106 |
| 2015/0346533 A1* | 12/2015 | Park | G02F 1/13394 349/42 |

* cited by examiner

ARRAY SUBSTRATE, METHOD OF MANUFACTURING THE SAME, AND LIQUID CRYSTAL DISPLAY PANEL

CROSS-REFERENCE TO RELATED APPLICATION

This application claims the benefits of Chinese Patent Application No. 201610016252.2 filed on Jan. 11, 2016 in the State Intellectual Property Office of China, a whole disclosure of which is incorporated herein by reference.

BACKGROUND OF THE INVENTION

Field of the Invention

Embodiments of the invention relate to field of display technologies, and specially, to an array substrate and a method of manufacturing the same, and a liquid crystal display panel having the same.

Description of the Related Art

A liquid crystal display (LCD) is usually formed through disposing a color filter substrate and an opposite array substrate with a liquid crystal molecule layer sandwiched between the color filter substrate and the array substrate. To ensure uniformity of the thickness of the liquid crystal molecule layer, spacers are usually provided as supports.

Figure 1:
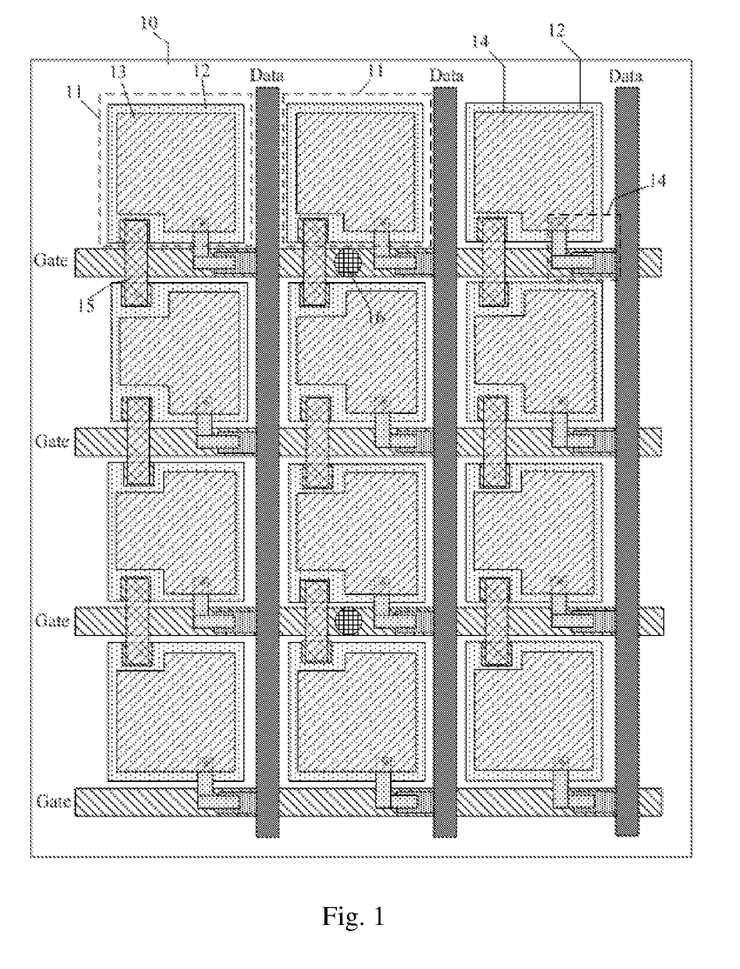
FIG. 1 is an illustrative drawing showing a structure of a prior art array substrate.

As shown in FIG. 1, prior art array substrate usually includes: a base substrate 10; a plurality of gate lines Gate and a plurality of data lines Data disposed to cross the plurality of gate lines; a plurality of pixel regions 11 defined by the gate lines Gate and the data lines Data, each of the pixel regions 11 including a common electrode 12, a pixel electrode 13 insulated from the common electrode and a respective thin film transistor (TFT) 14 associated with the pixel electrode 13; a connecting line 15 for connecting two adjacent common electrodes 12 in a column direction; and a spacer 16 disposed between the connecting line 15 and the TFT 14.

In a LCD panel including the above array substrate, however, when the spacer is subjected to an external force, it may be moved into the pixel region 11. Since an alignment film for controlling deflections of liquid crystal molecules in the liquid crystal molecule layer is provided in the pixel region 11, the movement of the spacer into the pixel region 11 may damage the alignment film, and the damaged alignment film may cause a disorder in deflections of the liquid crystal molecules, leading to deflections of liquid crystal molecules at damaged region(s) of the alignment film in a black state, and in turn, a light leakage of the LCD panel occurs, which influence display effect of the LCD panel.

SUMMARY OF THE INVENTION

The present invention has been made to overcome or alleviate at least one aspect of the above mentioned disadvantages.

Accordingly, it is an object of the present invention to provide an array substrate, a method for manufacturing the same, and a liquid crystal display panel, which may prevent spacers from moving and improve display effect of the liquid crystal display panel.

According to an aspect of the present invention, there is provided an array substrate.

In an exemplary embodiment, the array substrate may comprises: a base substrate; a plurality of first signal lines extending in a first direction; a plurality of second signal lines extending in a second direction; a plurality of common electrodes and a plurality of pixel electrodes located within a plurality of pixel regions defined by the plurality of first signal lines and the plurality of second signal lines respectively, the common electrodes being insulated from the pixel electrodes; a plurality of thin film transistors, each of the thin film transistors being connected with a respective pixel electrode and at least partially overlapping with a respective second signal line; a connecting part for connecting two common electrodes that are disposed adjacent to each other in the first direction; and a spacer located above the second signal line and between the connecting part and a corresponding thin film transistor. The first direction is perpendicular to the second direction; the connecting part is insulated from both of the first signal lines and the second signal lines; when viewed in a top view, the connection part is configured to enclose the spacer from three sides and the corresponding thin film transistor is arranged to enclose the spacer from a side other than the three sides; and a distance between an upper surface of the connection part and an upper surface of the base substrate is larger than a distance between a lower surface of the spacer and the upper surface of the base substrate.

In another embodiment, the connection part may comprise: two first sub-connection parts located within two adjacent pixel regions respectively and extending in the second direction; and a second sub-connection part for connecting the two first sub-connection parts.

In a further embodiment, the second sub-connection part may comprise a first extension portion extending in the first direction and two second extension portions extending from either end of the first extension portion in the second direction. An orthogonal projection of the second extension portion on the base substrate coincides with an orthogonal projection of the first sub-connection part on the base substrate.

In a further embodiment, the first sub-connection part and the second signal lines may be made in the same layer from the same material and have the same thickness; and/or the second sub-connection part and the first signal lines may be formed in the same layer from the same material and have the same thickness.

In a further embodiment, the connection part may be located above the common electrode.

In a further embodiment, the array substrate may further comprise a first insulating layer located between a layer in which the first signal lines lie and a layer in which the second signal lines lie. The layer in which the second signal lines lie may be located above the layer in which the first signal lines lie, the first sub-connection part of the connection part may be electrically connected with the second sub-connection part through a first via hole penetrating through the first insulating layer, and the second sub-connection part may be electrically connected with a corresponding common electrode. Alternately, the layer in which the first signal lines lie may be located above the layer in which the second signal lines lie, the second sub-connection part of the connection part may be electrically connected with the first sub-connection part through a first via hole penetrating through the first insulating layer, and the first sub-connection part may be electrically connected with a corresponding common electrode.

In a further embodiment, the array substrate may further comprise an electrically conductive layer located above the connection part. An orthogonal projection of the electrically conductive layer on the base substrate may fall within an orthogonal projection of the connection part on the base substrate.

In a further embodiment, the electrically conductive layer and the pixel electrodes may be formed in the same layer and insulated from one another.

In a further embodiment, the layer in which the second signal lines lie may be located above the layer in which the first signal lines lie, and the array substrate may further comprise a second insulating layer located between the layer in which the second signal lines lie and a layer in which the pixel electrodes lie, the electrically conductive layer being electrically connected with the first sub-connection part of the connection part through a second via hole penetrating through the second insulating layer.

In a further embodiment, the layer in which the first signal lines lie may be located above the layer in which the second signal lines lie, and the array substrate may further comprise a second insulating layer located between the layer in which the first signal lines lie and a layer in which the pixel electrodes lie, the electrically conductive layer being electrically connected with the second sub-connection part of the connection part through a second via hole penetrating through the second insulating layer.

In a further embodiment, the first signal lines may be data lines and the second signal lines may be gate lines. Alternately, the first signal lines may be gate lines and the second signal lines may be data lines.

According to another aspect of the invention, there is provided a liquid crystal display panel.

In an exemplary embodiment, the liquid crystal display panel may comprise: the array substrate according to any one of the above embodiments; an opposite substrate disposed opposite to the array substrate; and a liquid crystal layer located between the array substrate and the opposite substrate.

In the array substrate and the liquid crystal display panel provided in the embodiments of the invention, one side of the connection part for connecting two adjacent pixel electrodes, which faces the spacer, is configured to have a recessed structure, and the distance between the upper surface of the connection part and an upper surface of the base substrate within the two pixel regions of the pixel defining region is configured to be larger than the distance between the lower surface of the spacer and the upper surface of the base substrate, so that the spacer is limited within the position limiting structure formed by the connection part and the TFT and is prevented from moving into the pixel regions, thus, the spacer will not scrape the alignment film and a light leakage phenomenon of the LCD panel can be avoided from occurring, and display effect of the LCD panel is improved.

BRIEF DESCRIPTION OF THE DRAWINGS

The above and other features of the present invention will become more apparent by describing in detail exemplary embodiments thereof with reference to the accompanying drawings, in which:

FIG. 3a is an illustrative top view showing a structure of a connecting part in the array substrate of FIG. 2a;

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2A:
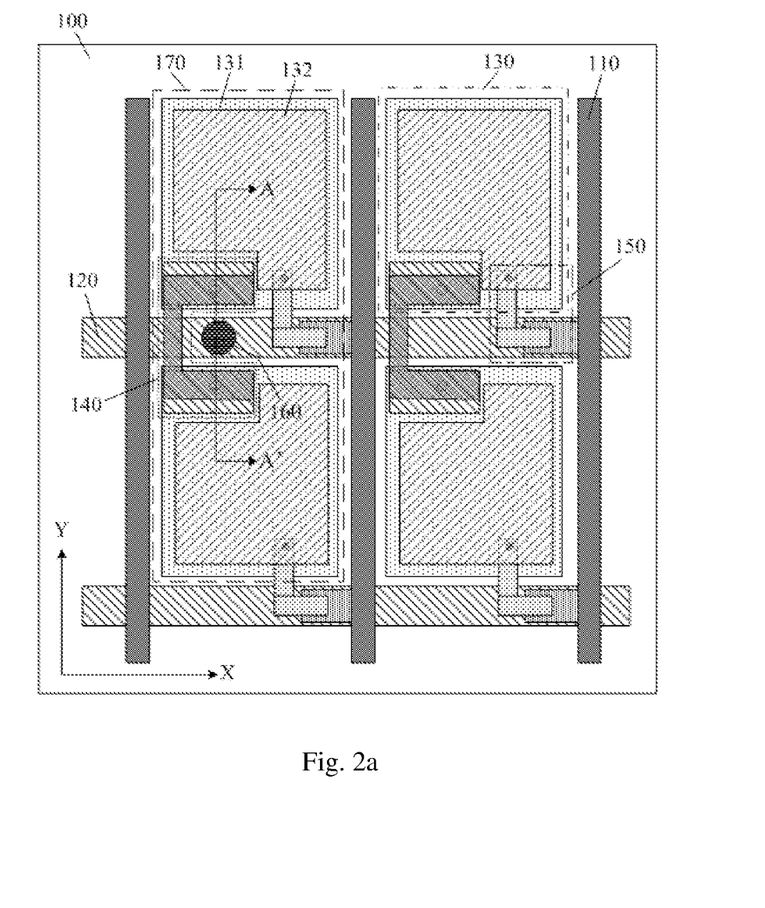
FIG. 2a is an illustrative top view showing a structure of an array substrate according to an embodiment of the invention.
Figure 2B:
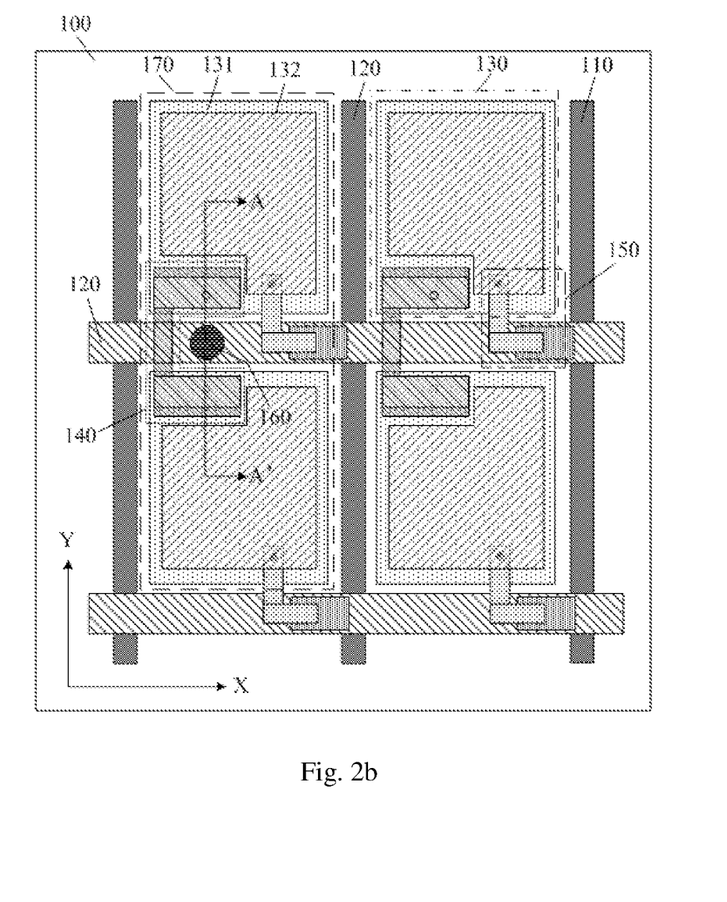
FIG. 2b is an illustrative top view showing a structure of an array substrate according to another embodiment of the invention.

In one aspect of the invention, there is provided an array substrate. In an exemplary embodiment, as shown in FIGS. 2a and 2b, the array substrate includes: a base substrate 100; a plurality of first signal lines 110 extending in a first direction Y; a plurality of second signal lines 120 extending in a second direction X; a plurality of common electrodes 131 and a plurality of pixel electrodes 132 located respectively within a plurality of pixel regions 130 defined by the plurality of first signal lines 110 and the plurality of second signal lines 120, each of the common electrodes being insulated from a respective pixel electrode; a plurality of TFTs 150, each TFT 150 being connected with a respective pixel electrode 132 and at least partially overlapping with a respective second signal line 120; a connecting part 140 for connecting two common electrodes 132 that are disposed adjacent to each other in the first direction Y; and a spacer 160 located above the second signal line 120 and between the connecting part 140 and a corresponding TFT 150. The first direction Y is perpendicular to the second direction X, and the connecting part 140 is insulated from both of the first signal lines 110 and the second signal lines 120.

In the top views shown in FIGS. 2a and 2b, two pixel regions 130 adjacent to the spacer 160 may be defined as a pixel defining region 170. The connection part 140 for connecting two common electrodes 131 within the pixel defining region 170 is arranged to enclose the spacer 160 from three sides, and the TFT 150 is arranged to enclose the spacer 160 from a side other than the three sides. A distance between an upper surface of the connection part 140 and an upper surface of the base substrate 100 is larger than a distance between a lower surface of the spacer 160 and the upper surface of the base substrate 100.

With the above manner, a position limiting structure for the spacer 160 is formed by the connection part 140 and the TFT 150 to prevent the spacer 160 from moving into the pixel regions 130.

In the array substrate provided in this embodiment, one side of the connection part for connecting two adjacent pixel electrodes, which faces the spacer, is configured to have a recessed structure, and the distance between the upper surface of the connection part and an upper surface of the base substrate within the two pixel regions of the pixel defining region is configured to be larger than the distance between the lower surface of the spacer and the upper surface of the base substrate, so that the spacer is limited within the position limiting structure formed by the connection part and the TFT and is prevented from moving into the pixel regions, thus, the spacer will not scrape the alignment film and a light leakage phenomenon of the LCD panel can be avoided from occurring, and display effect of the LCD panel is improved.

In the array substrate according to a further embodiment of the invention, only the connection part corresponding to the spacer is configured to have the recessed structure on the side thereof facing the spacer, while other connection parts that are not used to limit the spacer may not have the recessed structure, such that aperture ratios of pixel regions other than those in the pixel defining region may be increased.

In the array substrate according to a still further embodiment of the invention, as shown in FIGS. 2a and 2b, the connection parts 140 may have the same configuration, so that processes for manufacturing the connection parts 140 may be the same, and thereby difficulty of the processes may be decreased. The only difference between the embodiment shown in FIG. 2a and the embodiment shown in FIG. 2b lies in the relative arrangement between the first signal line 110 and the second signal line 120.

Figure 3A:
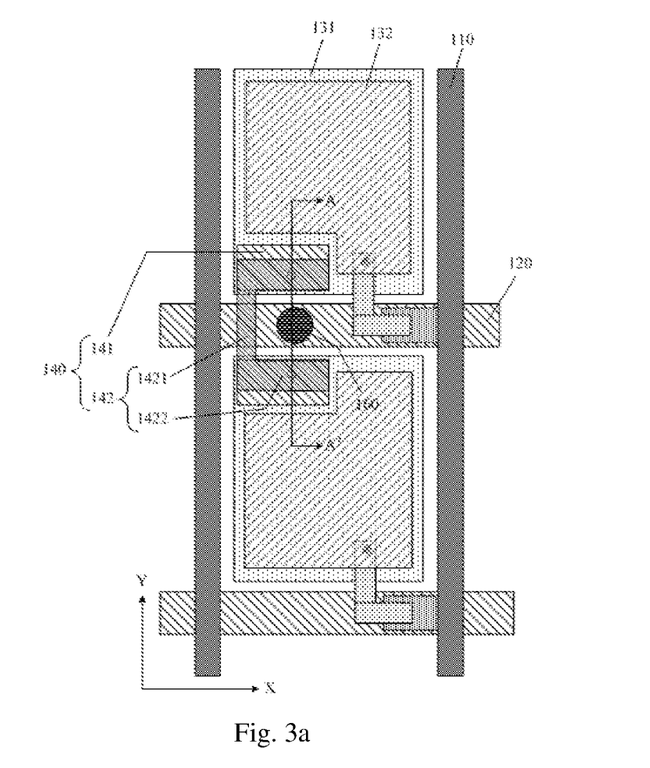
Figure 4A:
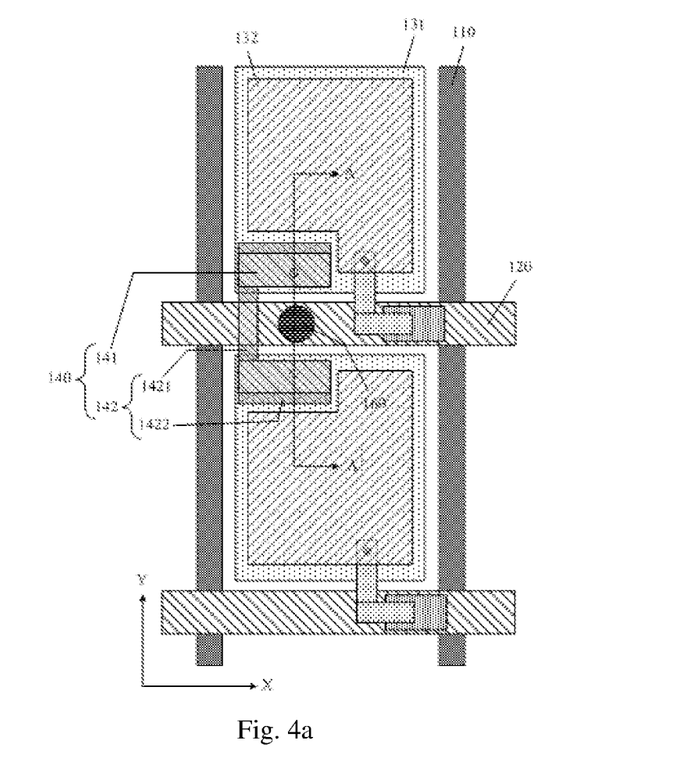
FIG. 4a is an illustrative top view showing a structure of a connecting part in the array substrate of FIG. 2b.

In the array substrate according to a still further embodiment of the invention, as shown in FIGS. 3a and 4a, the connection part 140 includes: two first sub-connection parts 141 located respectively within two adjacent pixel regions 130 and extending in the second direction X and a second sub-connection part 142 for connecting the two first sub-connection parts 141. The second sub-connection part 142 includes: a first extension portion 1421 extending in the first direction Y and two second extension portion 1422 extending from either end of the first extension portion 1421 in the second direction X. An orthogonal projection of the first sub-connection part 141 on the base substrate 100 covers an orthogonal projection of the second extension portion 1422 on the base substrate 100; or, the orthogonal projection of the second extension portion 1422 on the base substrate 100 covers the orthogonal projection of the first sub-connection part 141 on the base substrate 100.

In the array substrate according to a still further embodiment of the invention, in order that an aperture ratio of the display region of the pixel region will not be adversely influenced, the orthogonal projection of the second extension portion on the base substrate coincides with the orthogonal projection of the first sub-connection part on the base substrate.

In the array substrate according to a still further embodiment of the invention, a material of the first signal line and the second signal line may be a transparent electrically-conductive material, such as tin indium oxide (ITO), indium zinc oxide (IZO), carbon nanotubes, graphene or the like; it may also be a metal material, such as gold, silver, aluminum or the like. The material is not specifically limited herein.

In the array substrate according to an exemplary embodiment of the invention, since an electric resistance of a metal material is smaller than an electric resistance of a transparent electrically-conductive material, both of the first signal line and the second signal line are made from a metal material to reduce a power consumption of the signal lines.

Figure 3B:
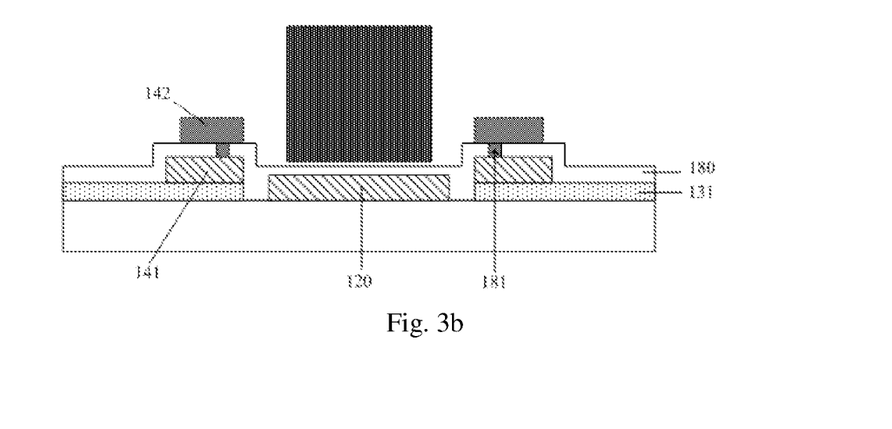
FIG. 3b is an illustrative partial sectional view taken along line A-A' in FIG. 2a, showing a cross section of the array substrate.
Figure 4B:
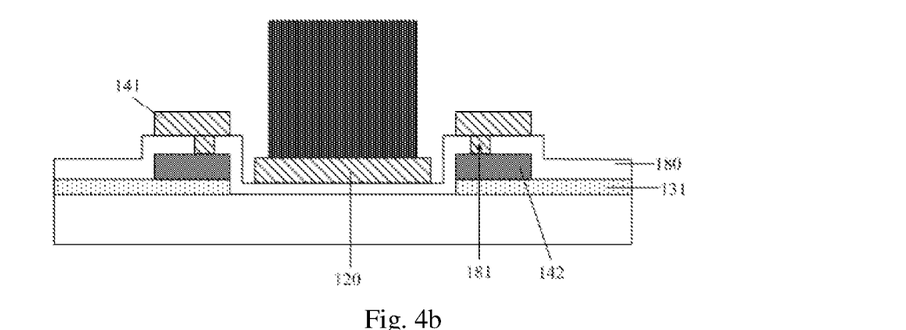
FIG. 4b is an illustrative partial sectional view taken along the line A-A' in FIG. 2b, showing a cross section of the array substrate.

In the array substrate according to the embodiment of the invention, in order to simplify the process of manufacturing the array substrate, the first sub-connection part 141 and the second signal line 120 are made in the same layer from the same material and have the same thickness, as shown in FIGS. 3b and 4b. For example, during manufacturing the array substrate 100, a pattern of first sub-connection part 141 and the second signal line 120 may be formed through a single patterning process, no additional process for manufacturing the first sub-connection part 141 is needed. In such a manner, the manufacturing process may be simplified, cost of production may be reduced, and production efficiency is improved.

In an alternative embodiment, as shown in FIGS. 3b and 4b, the second sub-connection part 142 and the first signal line (not shown in FIGS. 3b and 4b) may be formed in the same layer from the same material and have the same thickness. For example, during manufacturing the array substrate 100, a pattern of the second sub-connection part 142 and the first signal line may be formed through a single patterning process, no additional process for manufacturing the second sub-connection part 142 is needed. In such a manner, the manufacturing process may be simplified, cost of production may be reduced, and production efficiency is improved.

In another alternative embodiment, as shown in FIGS. 3b and 4b, the first sub-connection part 141 and the second signal line 120 may be formed in the same layer from the same material and have the same thickness, and the second sub-connection part 142 and the first signal line (not shown in FIGS. 3b and 4b) may be formed in the same layer from the same material and have the same thickness.

The connection part 140 may be located above the common electrode, or it may be located below the common electrode, which is not specifically limited herein. However, the following is described taking the connection part being located above the common electrode as an example (as shown in FIGS. 3b, 4b, 5b and 6b, for example).

In the array substrate according to a still further embodiment of the invention, as shown in FIGS. 3b and 4b, the array substrate may further include a first insulating layer 180 located between a layer in which the first signal lines 110 lie and a layer in which the second signal lines 120 lie.

In the exemplary embodiment shown in FIG. 3b, the layer in which the first signal lines (not shown in FIG. 3b) lie may be located above the layer in which the second signal lines 120 lie, the second sub-connection part 142 of the connection part 140 is electrically connected with the first sub-connection part 141 through a via hole 180 penetrating through the first insulating layer 180, and the first sub-connection part 141 is electrically connected with a corresponding common electrode 131.

The first sub-connection part 141 may directly contact the common electrode 131, or it may be electrically connected to the common electrode 131 directly or indirectly. When the first sub-connection part 141 directly contacts the common electrode 131 (as shown in FIG. 3*b*), the manufacturing process may be simplified, cost of production may be reduced, and production efficiency is improved.

In an alternative embodiment, as shown in FIG. 4*b*, the layer in which the second signal lines 120 lie may be located above the layer in which the first signal lines (not shown in FIG. 4*b*) lie, the first sub-connection part 141 of the connection part 140 is electrically connected with the second sub-connection part 142 through a via hole 181 penetrating through the first insulating layer 180, and the second sub-connection part 142 is electrically connected with a corresponding common electrode 131.

The second sub-connection part 142 may directly contact the common electrode 131, or it may be electrically connected to the common electrode 131 directly or indirectly. When the second sub-connection part 142 directly contacts the common electrode 131 (as shown in FIG. 4*b*), the manufacturing process may be simplified, cost of production may be reduced, and production efficiency is improved.

In an alternative embodiment that is not shown, when the layer in which the first signal lines lie is located above the layer in which the second signal lines lie, the array substrate may further include a common insulating layer located between the second signal lines and the common electrodes, and the first sub-connection part of the connection part may be electrically connected with a corresponding common electrode through a via hole penetrating through the common insulating layer.

In another alternative embodiment that is not shown, when the layer in which the second signal lines lie is located above the layer in which the first signal lines lie, the array substrate may further include a common insulating layer located between the first signal lines and the common electrodes, and the second sub-connection part of the connection part may be electrically connected with a corresponding common electrode through a via hole penetrating through the common insulating layer.

Figure 5A:
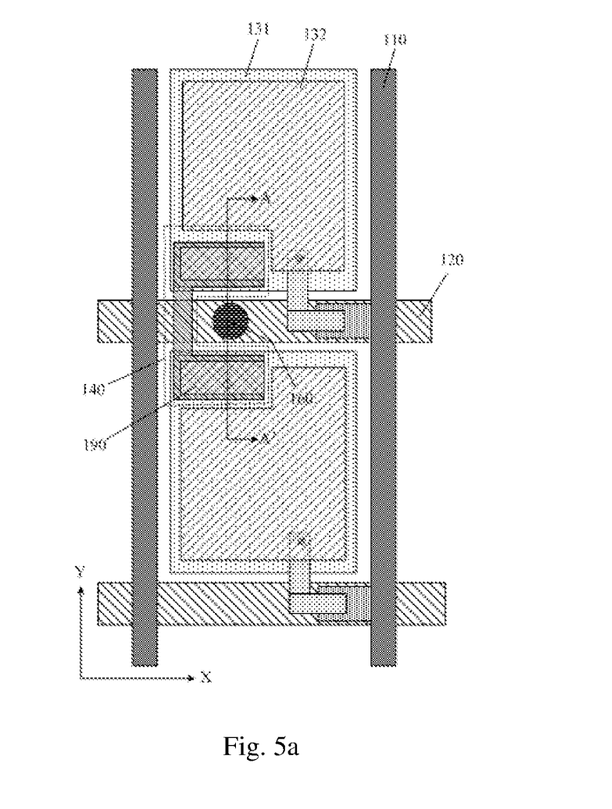
FIG. 5a is an illustrative top view showing a structure of an array substrate according to a further embodiment of the invention.
Figure 6A:
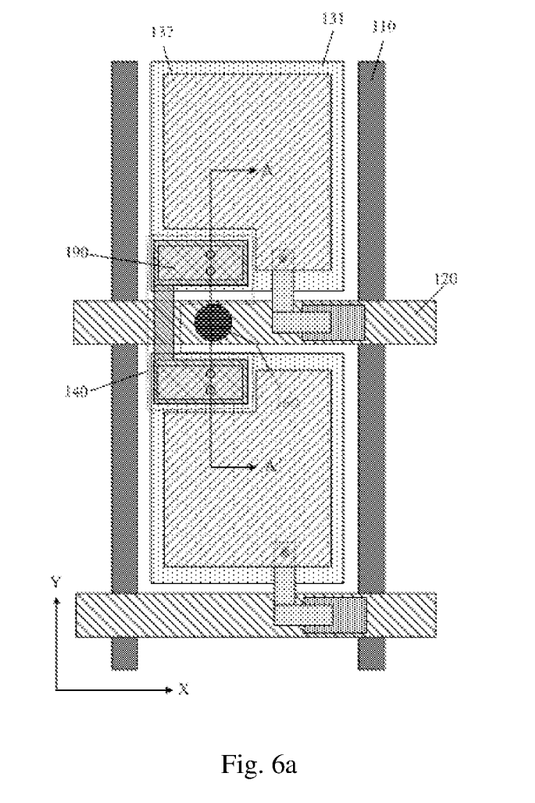
FIG. 6a is an illustrative top view showing a structure of an array substrate according to a still further embodiment of the invention.

Since an equivalent resistance of resistors which are connected in parallel is smaller than a sum of resistances of individual resistors, in order to decrease a resistance of the connection part, in a further exemplary embodiment, as shown in FIGS. 5*a* and 6*a*, the array substrate may further include an electrically conductive layer 190 located above the connection part 140. An orthogonal projection of the electrically conductive layer 190 on the base substrate 100 falls within an orthogonal projection of the connection part 140 on the base substrate 100. Through providing the electrically conductive layer above the connection part, the spacer may be further limited such that it will not enter the pixel regions.

In an exemplary embodiment, increasing an area of the electrically conductive layer may decrease an equivalent resistance of the connection part and the electrically conductive layer. In a further exemplary embodiment, to make sure that the electrically conductive layer does not influence the aperture ratio of the display region of the pixel region, the orthogonal projection of the connection part on the base substrate coincide with the orthogonal projection of the electrically conductive layer on the base substrate.

Figure 5B:
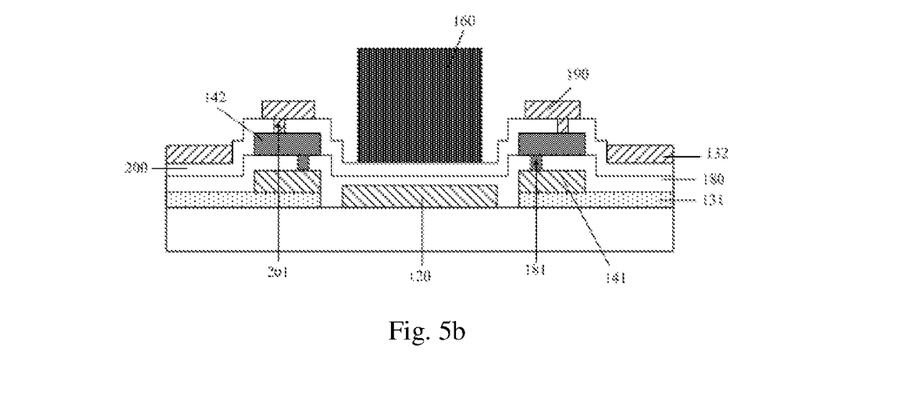
FIG. 5b is an illustrative partial sectional view taken along the line A-A' in FIG. 5a, showing a cross section of the array substrate.

In an exemplary embodiment, as shown in FIG. 5*b*, the electrically conductive layer 190 and the pixel electrodes 132 may be formed form the same material layer and insulated from one another. In such a way, during manufacturing the array substrate 100, a pattern of the electrically conductive layer 190 and the pixel electrode 132 may be formed through a single patterning process, no additional process for manufacturing the electrically conductive layer 190 is needed, thus, the manufacturing process may be simplified, cost of production may be reduced, and production efficiency is improved.

In an exemplary embodiment, as shown in FIG. 5*b*, when the layer in which the first signal lines (not shown in FIG. 5*b*) lie is located above the layer in which the second signal lines 120 lie, the array substrate may further include a second insulating layer 200 located between the layer in which the first signal lines lie and a layer in which the pixel electrodes 132 lie. The electrically conductive layer 190 is electrically connected with the second sub-connection part 142 of the connection part 140 through a second via hole 201 penetrating through the second insulating layer 200.

Figure 6B:
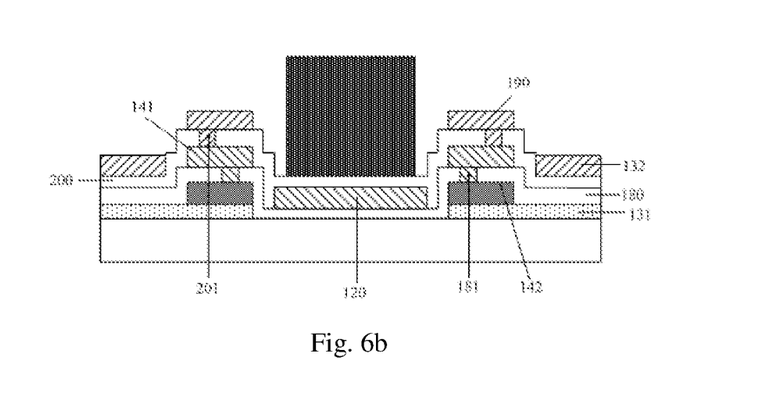
FIG. 6b is an illustrative partial sectional view taken along the line A-A' in FIG. 6a, showing a cross section of the array substrate.

In an exemplary alternative embodiment, as shown in FIG. 6*b*, when the layer in which the second signal lines 120 lie is located above the layer in which the first signal lines (not shown in FIG. 6*b*) lie, the array substrate may further include a second insulating layer 200 located between the layer in which the second signal lines 120 lie and the layer in which the pixel electrodes 132 lie. The electrically conductive layer 190 is electrically connected with the first sub-connection part 141 of the connection part 140 through a second via hole 201 penetrating through the second insulating layer 200.

In an exemplary embodiment, the first signal line may be a data line, and the second signal line may be a gate line; or, the first signal line may be a gate line, and the second signal line may be a data line.

Generally, a TFT includes: a gate electrode and an active layer that are insulated from one another; and a source electrode and a drain electrode that are connected with the active layer. The gate electrode and the gate line may be formed from the same material layer, and the source electrode and the drain electrode may be formed from the same material layer.

Generally, the base substrate may be provided with other structures and films thereon, which are the same as those in prior arts, thus, a detailed description thereof are omitted herein.

According to another aspect of the invention, there is provided a method of manufacturing an array substrate. Based on the same inventive concept, when the connection part of the array substrate includes a first sub-connection part and a second sub-connection part, the method of manufacturing the array substrate according to an embodiment of the invention includes:

forming the first sub-connection part and the second signal line through a single patterning process; and/or forming the second sub-connection part and the first signal line through a single patterning process.

In an example, the patterning process may only include a photoetching process. In another example, the patterning process may include a photoetching process and an etching process. In other examples, the patterning process may also include printing, ink-jetting and other processes for forming a predetermined pattern. A photoetching process is a process utilizing photoresist, a mask, an exposure machine and the like to form a pattern, and including filming, exposing, developing and the like. A patterning process may be determined based on the structure to be formed in practice.

In an exemplary embodiment of the method, the first sub-connection part and the second signal line are formed through a single patterning process, no additional process for forming the first sub-connection part is needed, thus, the manufacturing process may be simplified, cost of production may be reduced, and production efficiency is improved.

In an alternative embodiment of the method, the second sub-connection part and the first signal line are formed through a single patterning process, no additional process for forming the second sub-connection part is needed, thus, the manufacturing process may be simplified, cost of production may be reduced, and production efficiency is improved.

In another alternative embodiment of the method, the first sub-connection part and the second signal line are formed through a single patterning process, and the second sub-connection part and the first signal line are formed through a single patterning process. In such a manner, the pattern of the first sub-connection part and the second signal line and the pattern of the second sub-connection part and the first signal line may be formed by only two patterning processes, such that the manufacturing process may be further simplified, cost of production may be further reduced, and production efficiency is further improved.

When the array substrate includes the electrically conductive layer as described above, the method may further include forming the electrically conductive layer and a pixel electrode through a single patterning process. In such a manner, a pattern of the electrically conductive layer and a pattern of the pixel electrode may be formed at the same time, such that the manufacturing process may be simplified, cost of production may be reduced, and production efficiency is improved.

A manufacturing method will be described taking the array substrate shown in FIGS. 5b and 6b as an example. The description hereinafter will be made in conjunction with an example in which the first signal line is a data line and the second signal line is a gate line, however, the invention is not limited thereto.

Figure 7A:
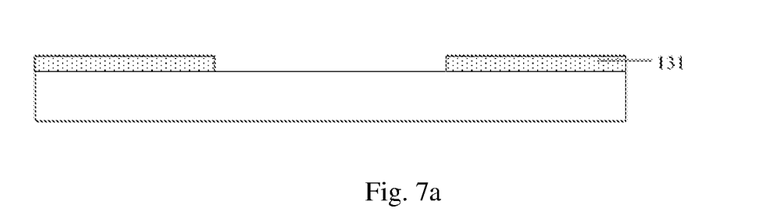
FIGS. 7a to 7e show exemplary steps of a method of manufacturing an array substrate according to an embodiment of the invention.
Figure 7B:
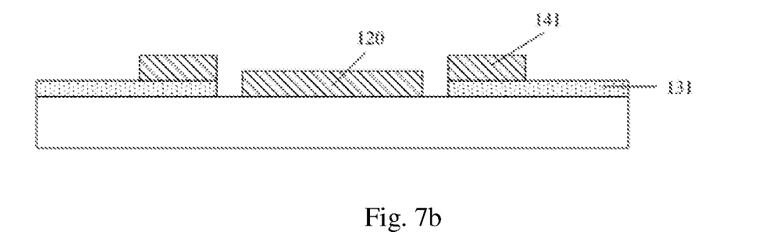
Figure 7C:
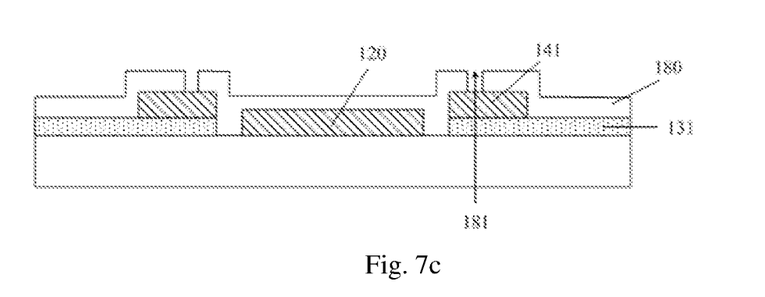
Figure 7D:
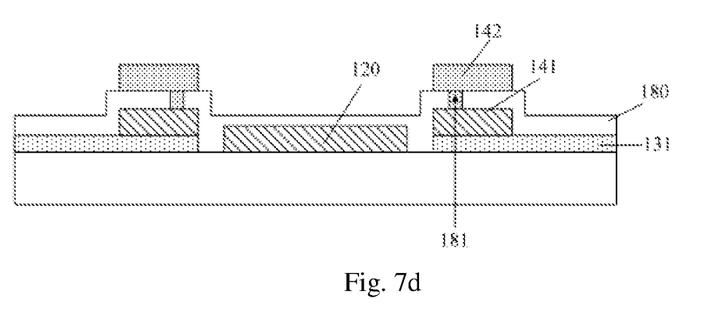
Figure 7E:
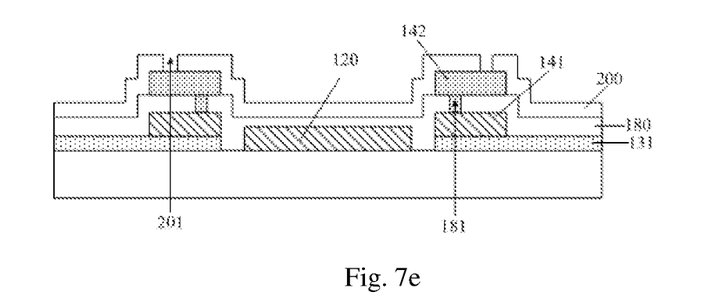

Taking the array substrate shown in FIG. 5b as an example, a method of manufacturing an array substrate may include the following steps:

(1) forming a pattern of the common electrode 131 on the base substrate 100 through a single patterning process, as shown in FIG. 7a;

(2) forming a pattern at least including the second signal line 120 and the first sub-connection part 141 on the base substrate 100 through a single patterning process, the first sub-connection part 141 being directly electrically connected with the common electrode 131, as shown in FIG. 7b;

(3) forming a pattern of the first insulating layer 180 having the via hole 181 therein through a single patterning process, as shown in FIG. 7c;

(4) forming a pattern at least including the first signal line (not shown in FIG. 7d) and the second sub-connection part 142 through a single patterning process, the second sub-connection part 142 being electrically connected with the first sub-connection part 141 through the via hole 181 penetrating through the first insulating layer 180, as shown in FIG. 7d;

(5) forming a pattern of the second insulating layer 200 having the via hole 201 therein through a single patterning process, as shown in FIGS. 7e; and (6) forming a pattern of the electrically conductive layer 190 and the pixel electrode 132, the electrically conductive layer 190 being electrically connected with the second sub-connection part 142 through the via hole penetrating through the second insulating layer 200, as shown in FIG. 5b.

In a further embodiment, after the step (3) and before the step (4), the method of manufacturing the array substrate further includes: forming a pattern of an active layer of the TFT.

Figure 8A:
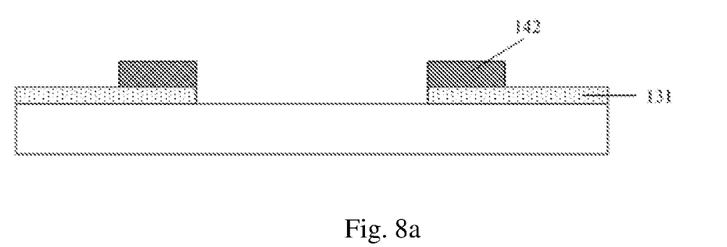
FIGS. 8a to 8d show exemplary steps of a method of manufacturing an array substrate according to another embodiment of the invention.
Figure 8B:
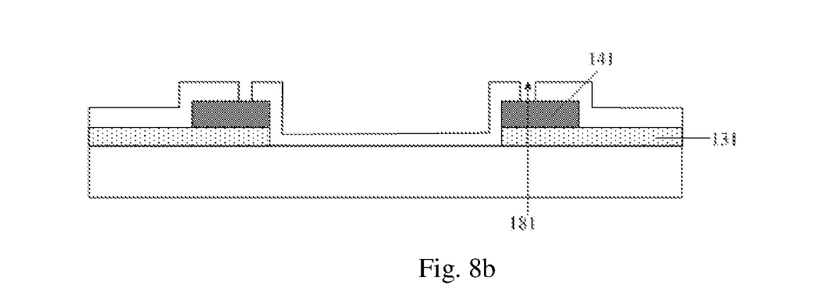
Figure 8C:
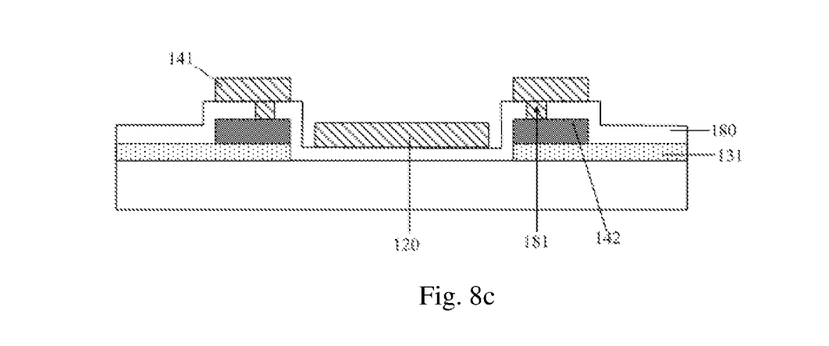
Figure 8D:
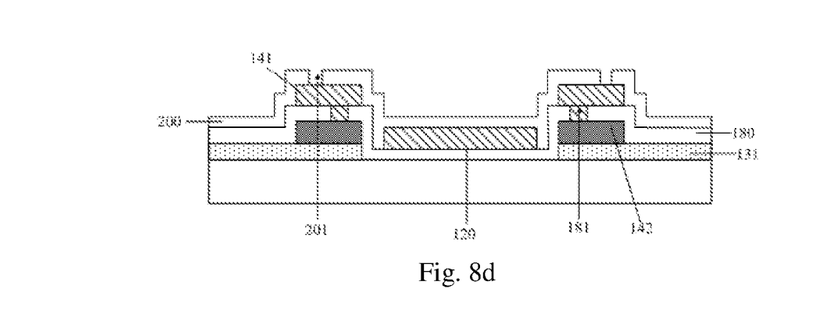

Taking the array substrate shown in FIG. 6b for example, a method of manufacturing an array substrate may include the following steps:

(1) forming a pattern of the common electrode 131 on the base substrate 100 through a single patterning process, as shown in FIG. 7a;

(2) forming a pattern at least including the first signal line (not shown in FIG. 8a) and the second sub-connection part 142 through a single patterning process, the second sub-connection part 142 being directly electrically connected with the common electrode 131, as shown in FIG. 8a;

(3) forming a pattern of the first insulating layer 180 having the via hole 181 therein through a single patterning process, as shown in FIG. 8b;

(4) forming a pattern at least including the second signal line 120 and the first sub-connection part 141 on the base substrate 100 through a single patterning process, the first sub-connection part 141 being directly electrically connected with the second sub-connection part 142 through the via hole 181 penetrating through the first insulating layer 180, as shown in FIG. 8c;

(5) forming a pattern of the second insulating layer 200 having the via hole 201 therein through a single patterning process, as shown in FIGS. 8d; and (6) forming a pattern of the electrically conductive layer 190 and the pixel electrode 132, the electrically conductive layer 190 being electrically connected with the second sub-connection part 142 through the via hole penetrating through the second insulating layer 200, as shown in FIG. 6b.

In a further embodiment, after the step (3) and before the step (4), the method of manufacturing the array substrate further includes: forming a pattern of an active layer of the TFT.

In a further aspect of the invention, there is provided a LCD panel. In an exemplary embodiment, the LCD panel includes an array substrate, an opposite substrate disposed opposite to the array substrate, and a liquid crystal layer located between the opposite substrate and the array substrate, the array substrate being the array substrate according to any one of the above embodiments of the invention.

In the array substrate and the LCD panel provided in the embodiments of the invention, one side of the connection part for connecting two adjacent pixel electrodes, which faces the spacer, is configured to have a recessed structure, and the distance between the upper surface of the connection part and an upper surface of the base substrate within the two pixel regions of the pixel defining region is configured to be larger than the distance between the lower surface of the spacer and the upper surface of the base substrate, so that the spacer is limited within the position limiting structure formed by the connection part and the TFT and is prevented from moving into the pixel regions, thus, the spacer will not scrape the alignment film and a light leakage phenomenon of the LCD panel can be avoided from occurring, and display effect of the LCD panel is improved.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An array substrate, comprising:
   a base substrate;
   a plurality of first signal lines extending in a first direction;
   a plurality of second signal lines extending in a second direction;
   a plurality of common electrodes and a plurality of pixel electrodes located within a plurality of pixel regions defined by the plurality of first signal lines and the plurality of second signal lines respectively, the common electrodes being insulated from the pixel electrodes;
   a plurality of thin film transistors, each of the thin film transistors being connected with a respective pixel electrode and at least partially overlapping with a respective second signal line;
   a connecting part for connecting two common electrodes that are disposed adjacent to each other in the first direction; and
   a spacer located above the second signal line and between the connecting part and a corresponding thin film transistor,
   wherein:
   the first direction is perpendicular to the second direction;
   the connecting part is insulated from both of the first signal lines and the second signal lines;
   when viewed in a top view, the connection part is configured to enclose the spacer from three sides and the corresponding thin film transistor is arranged to enclose the spacer from a side other than the three sides; and
   a distance between an upper surface of the connection part and an upper surface of the base substrate is larger than a distance between a lower surface of the spacer and the upper surface of the base substrate.

2. The array substrate according to claim 1, wherein the connection part comprises:
   two first sub-connection parts located within two adjacent pixel regions respectively and extending in the second direction; and
   a second sub-connection part for connecting the two first sub-connection parts.

3. The array substrate according to claim 1, wherein the second sub-connection part comprises:
   a first extension portion extending in the first direction; and
   two second extension portions extending from either end of the first extension portion in the second direction,
   wherein an orthogonal projection of the second extension portion on the base substrate coincides with an orthogonal projection of the first sub-connection part on the base substrate.

4. The array substrate according to claim 3, wherein the first sub-connection part and the second signal lines are made in the same layer from the same material and have the same thickness; and/or wherein the second sub-connection part and the first signal lines are formed in the same layer from the same material and have the same thickness.

5. The array substrate according to claim 4, wherein the connection part is located above the common electrode.

6. The array substrate according to claim 5, further comprising a first insulating layer located between a layer in which the first signal lines lie and a layer in which the second signal lines lie, the layer in which the first signal lines lie being located above the layer in which the second signal lines lie, the first sub-connection part of the connection part being electrically connected with the second sub-connection part through a first via hole penetrating through the first insulating layer, and the second sub-connection part being electrically connected with a corresponding common electrode.

7. The array substrate according to claim 6, further comprising an electrically conductive layer located above the connection part, an orthogonal projection of the electrically conductive layer on the base substrate falling within an orthogonal projection of the connection part on the base substrate.

8. The array substrate according to claim 7, wherein the electrically conductive layer and the pixel electrodes are formed in the same layer and insulated from one another.

9. The array substrate according to claim 8,
   wherein the layer in which the second signal lines lie is located above the layer in which the first signal lines lie, and
   wherein the array substrate further comprises a second insulating layer located between the layer in which the second signal lines lie and a layer in which the pixel electrodes lie, the electrically conductive layer being electrically connected with the first sub-connection part of the connection part through a second via hole penetrating through the second insulating layer.

10. The array substrate according to claim 8,
    wherein the layer in which the first signal lines lie is located above the layer in which the second signal lines lie, and
    wherein the array substrate further comprises a second insulating layer located between the layer in which the first signal lines lie and a layer in which the pixel electrodes lie, the electrically conductive layer being electrically connected with the second sub-connection part of the connection part through a second via hole penetrating through the second insulating layer.

11. The array substrate according to claim 5, further comprising a first insulating layer located between a layer in which the first signal lines lie and a layer in which the second signal lines lie, the layer in which the first signal lines lie being located above the layer in which the second signal lines lie, the second sub-connection part of the connection part being electrically connected with the first sub-connection part through a first via hole penetrating through the first insulating layer, and the first sub-connection part being electrically connected with a corresponding common electrode.

12. The array substrate according to claim 11, further comprising an electrically conductive layer located above the connection part, an orthogonal projection of the connection part on the base substrate covering an orthogonal projection of the electrically conductive layer on the base substrate.

13. The array substrate according to claim 12, wherein the electrically conductive layer and the pixel electrode are formed in the same layer and insulated from one another.

14. The array substrate according to claim 13,
    wherein the layer in which the second signal lines lie is located above the layer in which the first signal lines lie, and
    wherein the array substrate further comprises a second insulating layer located between the layer in which the second signal lines lie and a layer in which the pixel electrodes lie, the electrically conductive layer being electrically connected with the first sub-connection part of the connection part through a second via hole penetrating through the second insulating layer.

15. The array substrate according to claim 13,
wherein the layer in which the first signal lines lie is located above the layer in which the second signal lines lie, and
wherein the array substrate further comprises a second insulating layer located between the layer in which the first signal lines lie and a layer in which the pixel electrodes lie, the electrically conductive layer being electrically connected with the second sub-connection part of the connection part through a second via hole penetrating through the second insulating layer.

16. The array substrate according to claim 1, wherein the first signal lines are data lines and the second signal lines are gate lines.

17. The array substrate according to claim 1, wherein the first signal lines are gate lines and the second signal lines are data lines.

18. A liquid crystal display panel, comprising:
the array substrate according to claim 1;
an opposite substrate disposed opposite to the array substrate; and
a liquid crystal layer located between the array substrate and the opposite substrate.

* * * * *